United States Patent
Martin et al.

(10) Patent No.: US 8,943,327 B2
(45) Date of Patent: Jan. 27, 2015

(54) APPARATUS AND METHOD TO ENABLE OPERATION BETWEEN A MAIN ASSEMBLY AND A SUB-ASSEMBLY THAT ARE CRYPTOGRAPHICALLY RELATED

(75) Inventors: Christopher Martin, Bath (GB); Mark Aris, South Gloucestershire (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 862 days.

(21) Appl. No.: 12/694,780

(22) Filed: Jan. 27, 2010

(65) Prior Publication Data

US 2011/0185187 A1    Jul. 28, 2011

(51) Int. Cl.
| | |
|---|---|
| *G06F 21/00* | (2013.01) |
| *G06F 21/74* | (2013.01) |
| *G06F 21/60* | (2013.01) |
| *G06F 21/73* | (2013.01) |
| *H04L 9/08* | (2006.01) |

(52) U.S. Cl.
CPC ............. *G06F 21/74* (2013.01); *G06F 21/602* (2013.01); *G06F 21/73* (2013.01); *H04L 9/0897* (2013.01); *G06F 2221/2107* (2013.01); *G06F 2221/2129* (2013.01); *H04L 2209/80* (2013.01)

USPC .......................................................... 713/189

(58) Field of Classification Search
None
See application file for complete search history.

(56) References Cited

U.S. PATENT DOCUMENTS

| | | | |
|---|---|---|---|
| 6,463,537 B1 * | 10/2002 | Tello .............................. | 713/182 |
| 6,886,095 B1 * | 4/2005 | Hind et al. ..................... | 713/168 |
| 2002/0077094 A1 * | 6/2002 | Leppanen ...................... | 455/420 |
| 2002/0151295 A1 * | 10/2002 | Boss et al. ..................... | 455/412 |
| 2004/0006700 A1 * | 1/2004 | Freeman et al. ............... | 713/189 |
| 2005/0075092 A1 * | 4/2005 | Kim ................................ | 455/411 |
| 2005/0147250 A1 * | 7/2005 | Tang .............................. | 380/259 |
| 2005/0180574 A1 * | 8/2005 | Ritz et al. ...................... | 380/277 |
| 2006/0036853 A1 * | 2/2006 | Chen et al. .................... | 713/161 |

* cited by examiner

Primary Examiner — William Goodchild

(57) ABSTRACT

According to one aspect of embodiments of the present invention there is provided apparatus comprising a main assembly having a processing element configured to: obtain a first and second sub-assembly identifier stored on a second-assembly in communication with the main assembly; and enable operation of the main assembly and second assembly based on a determination that the first and second sub-assembly identifiers are cryptographically related.

12 Claims, 2 Drawing Sheets

APPARATUS AND METHOD TO ENABLE OPERATION BETWEEN A MAIN ASSEMBLY AND A SUB-ASSEMBLY THAT ARE CRYPTOGRAPHICALLY RELATED

BACKGROUND

Many electronic and mechanical devices are comprised of different electronic circuit boards or other assemblies. Typically, electronic devices have one main, or primary, board or assembly, and may have zero or more secondary boards or sub-assemblies coupled thereto.

For example, tape storage devices may have a main controller board and one or more other assemblies, such as mechanisms, tape heads, display assemblies, etc. Desktop computers, for example, may have a primary board (or motherboard) and numerous other secondary boards, such as graphics cards, sound cards, network cards, etc.

In many circumstances manufacturers prefer that their electronic devices comprise only assemblies manufactured, tested, or authorized for use by the manufacturer. In many cases, correct or optimum operation of a device may only be assured if different assemblies within a device have been configured, tuned, matched, etc., to work together.

For example, in enterprise tape storage devices tape heads and mechanisms typically require significant calibration during manufacture, with the calibration data being stored in a memory on a subassembly. The calibration data is used by a tape storage device main assembly to ensure optimum or near optimum operation of the tape storage device. If a tape mechanism is replaced or repaired by the manufactured or authorized service agent, the replacement or repair process will typically include a re-calibration of the tape mechanism and the storing in the tape mechanism sub-assembly memory of appropriate calibration data. If, however, a tape head or mechanism is replaced or repaired by an unauthorized service agent they typically will not be willing or able to update the calibration data stored in the sub-assembly memory, and the operation of the tape storage device may well be sub-optimum. This may, for example, put at risk the integrity of data written or read by the device

BRIEF DESCRIPTION

Embodiments of the invention will now be described, by way of non-limiting example only, with reference to the accompanying drawings, in which.

SUMMARY OF THE INVENTION

According to a first aspect of embodiments of the present invention, there is provided apparatus comprising a main assembly having a processing element. The processing element is configured to obtain a first and second sub-assembly identifier stored on a second-assembly in communication with the main assembly, and to enable operation of the main assembly and second assembly based on a determination that the first and second sub-assembly identifiers are cryptographically related.

According to a second aspect of embodiments of the present invention, there is provided a computer readable medium, having embodied thereon computer readable code which, when executed, performs a method of controlling the operation of an electronic device having a main assembly, the method comprising: obtaining, from a memory on a sub-assembly coupled to the main assembly, a first sub-assembly identifier and a second sub-assembly identifier, determining whether the first and second sub-assembly identifiers are cryptographically related and where it is so determined, allowing operation of the device.

According to a third aspect of embodiments of the present invention, there is provided a method of pairing a second assembly with a main assembly of an electronic device, the main assembly having a processing element and associated instruction memory. The method comprises programming the instruction memory of the main assembly with first program code to perform the steps of: obtaining a first sub-assembly identifier from a memory on the sub-assembly; generating a second sub-assembly identifier by performing a cryptographic operation on the obtained first sub-assembly identifier using a cryptographic key stored on the first assembly; and storing the generated second sub-assembly identifier in the sub-assembly memory. The method further comprises executing the first program code, and programming the instruction memory of the main assembly with second program code enabling operation of the main assembly and sub-assembly.

DETAILED DESCRIPTION

Figure 1:
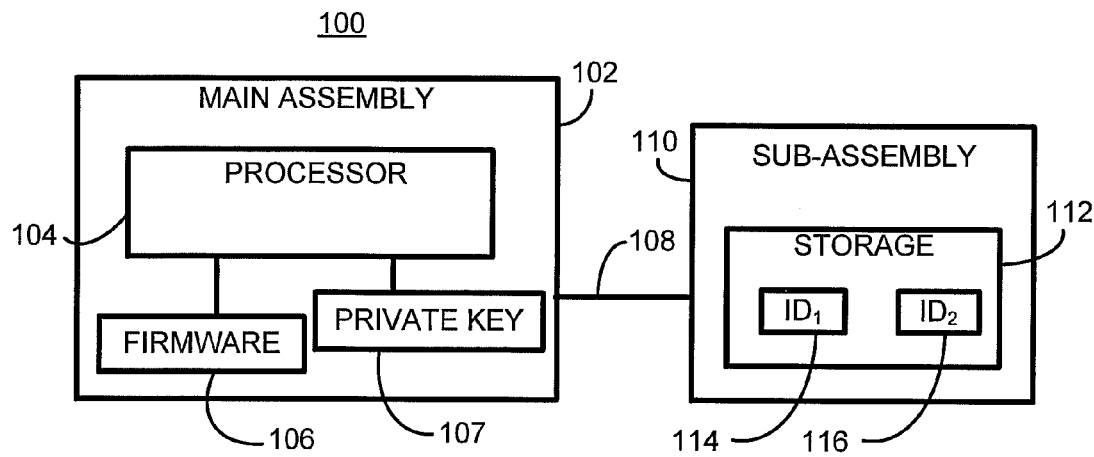
FIG. 1 is a block diagram showing an overview of a system according to an embodiment of the present invention.

Referring now to FIG. 1, there is shown a simplified block diagram of a device 100, such as an electronic device, an electro-mechanical device, or the like, according to one embodiment of the present invention. Those skilled in the art will appreciate that for clarity, elements such as power supplies, user interfaces, casings, etc., are not shown.

The device 100 comprises a main assembly 102 and a sub-assembly 110. Each assembly may, for example, comprise an electronic circuit board, one or more electronic components, a mechanical assembly, a display device, etc.

Elements of the main assembly 102 and sub-assembly 110 are coupled by a communication link 108. The communication link may, for example, be a wired bus, a wireless communication link, an optical communication link, or any other appropriate communication link or channel.

The main assembly 102 comprises a processor or controller 104 for controlling the operation of the main assembly and sub-assembly. Programming instructions, hereinafter referred to as the firmware, are stored in a memory 106 which is coupled to the processor 104 by a suitable bus. The main assembly 102 also comprises a memory 107, such as a non-volatile memory, for storing an encryption key. In the present embodiment the encryption key stored in the memory 107 of the device 100 is substantially unique to all similar devices manufactured by or for the device manufacturer.

In a further embodiment the processor 104 and the firmware memory 106 may be integrated into a single device. In a yet further embodiment, for added security, the memory 107 may be integrated with the processor 104 in a single device with the memory 107 in which the encryption key is stored. Such an arrangement prevents access to the encryption key from outside the processor 104 thereby enhancing security.

The sub-assembly 110 comprises a suitable non-volatile memory 112, for storing at least a first sub-assembly identifier $ID_1$ 114 and a second sub-assembly identifier $ID_2$ 116. The contents of the memory 112 are accessible for both reading and writing by the processor 104 of the main assembly 102 over the communication link 108.

Figure 2:
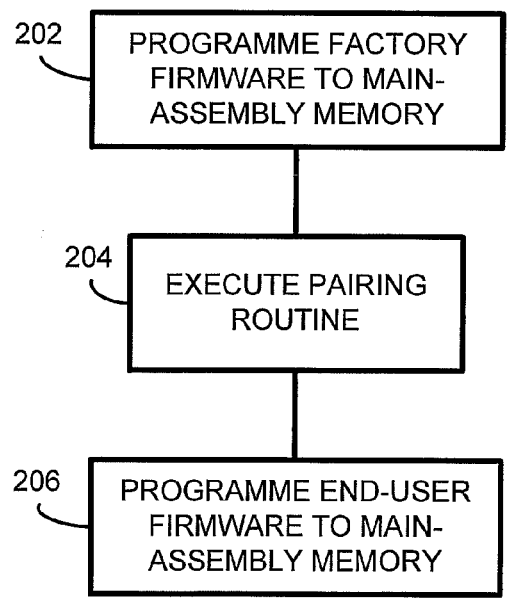
FIG. 2 is a flow diagram outlining an example method of configuring a device according to one embodiment of the present invention.

Referring now to FIG. 2, there is shown a flow diagram outlining an example method of configuring the device 100 according to one embodiment of the present invention.

At 202, a first set of programming instructions are stored in the firmware memory 106. This may be performed, for example, during manufacture or servicing of the device 100 by the manufacturer or authorized service agent, in any one of a number of generally known ways. For example, if the firmware memory 106 is stored in a removable memory chip, the memory 106 may be removed from the main assembly 102 and programmed with the first set of programming instructions by an external programming device. Alternatively, if the main assembly provides external access to the memory 106, for example through a bus coupling the memory 106 to the processor 104, the storing of the first set of programming instructions may be performed by connecting a suitable programming device to the main assembly.

The first set of programming instructions includes at least a pairing routine used for pairing the main assembly 102 with the sub-assembly 110.

At 204, the pairing routine is executed by the processor 104, as described in further detail below.

At 206, the first set of programming instructions are removed from the firmware memory 106, and a second set of programming instructions are stored therein. The second set of programming instructions comprise the firmware for use outside of the manufacturing, calibration, or service environment. For example, the second set of programming instructions comprise the firmware intended to control the device 100 when used by the end-customer or end-user. Part of those programming instructions comprise a pairing verification routine, as described below in further details.

Figure 3:
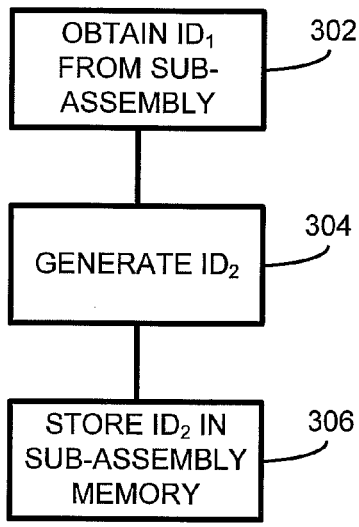
FIG. 3 is a flow diagram outlining the operation of a pairing routine according to an embodiment of the present invention.

Referring now to FIG. 3 is shown a flow diagram outlining the operation of the pairing routine according to an embodiment of the present invention.

When the pairing routine of the first set of programming instructions is executed by the processor 104 the processor 104 reads (302) the first sub-assembly identifier $ID_1$ stored in the memory 112 of the sub-assembly.

The processor 104 then generates (304) a second sub-assembly identifier $ID_2$ by performing a cryptographic function $f_1$ on the first sub-assembly identifier $ID_1$ using the cryptographic key stored in the memory 107.

$$ID_2 = f_1(ID_1, PRIVATE\_KEY)$$

The cryptographic function $f_1$ may, for example, be stored in the firmware memory 106, or may in alternative embodiments be stored integral to the processor 104. In the present embodiment the cryptographic function $f_1$ is a symmetric encryption algorithm such as AES (advanced encryption standard). Those skilled in the art will appreciate, however, that in other embodiments other cryptographic functions, including asymmetrical algorithms may be used. The encryption strength of the cryptographic function $f_1$ is chosen such that there is no practical possibility of generating $ID_2$ from $ID_1$ without knowledge of the private key.

The processor 104 then stores (306) the generated second sub-assembly identifier $ID_2$ in the memory 112 of the sub-assembly 110.

The above-described pairing routing process provides a mechanism which uniquely pairs a given sub-assembly with a given main assembly. This pairing subsequently enables the device 100 to verify, for example at power-up or at intermittent periods during operation, whether the sub-assembly associated with the main assembly has been paired by the above-described pairing process.

Figure 4:
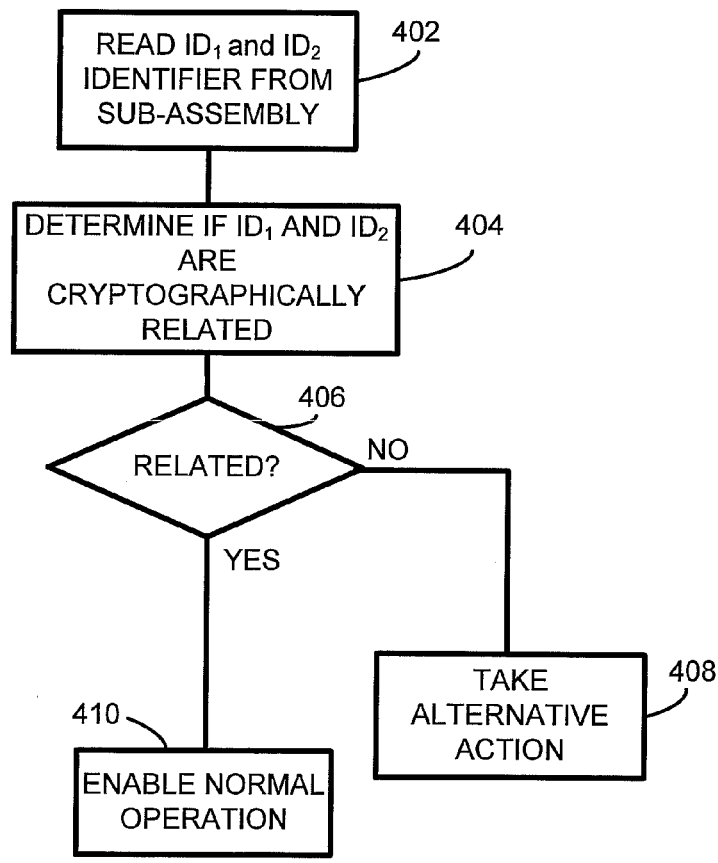
FIG. 4 is a flow diagram outlining an example verification routine according to an embodiment of the present invention.

A verification routine, shown in FIG. 4, is included in the second set of programming instructions stored in the firmware memory 106 as described above (206).

When the verification routine is executed the processor 104 reads (402) the first 114 and second 116 sub-assembly identifiers $ID_1$ and $ID_2$ from the sub-assembly memory 112. The processor 104 determines (404) whether read first and second sub-assembly identifiers $ID_1$ and $ID_2$ are cryptographically related using the cryptographic key stored in memory 107.

In one embodiment, the determination of whether first and second sub-assembly identifiers $ID_1$ and $ID_2$ are cryptographically related is made by encrypting the first sub-assembly identifier $ID_1$ by performing the cryptographic function $f_1$ on the first sub-assembly identifier $ID_1$ using the cryptographic key stored in the memory 107. If the result is the same as the second sub-assembly identifier $ID_2$ it is determined (406) that the main assembly 102 and sub-assembly 110 are appropriately paired. Otherwise, it is determined that the main assembly 102 and sub-assembly 110 are not appropriately paired.

In a further embodiment, the determination of whether the first and second sub-assembly identifiers $ID_1$ and $ID_2$ are cryptographically related to the cryptographic key stored in memory 107 is made by decrypting the second sub-assembly identifier $ID_2$ by performing thereon the inverse of the cryptographic function $f_1$ using the cryptographic key stored in the memory 107. If the result is the same as the first sub-assembly identifier $ID_1$ it is determined (406) that the main assembly 102 and sub-assembly 110 are appropriately paired. Otherwise, it is determined that the main assembly 102 and sub-assembly 110 are not appropriately paired.

In further embodiments, different cryptographic functions may be used and one or more additional cryptographic keys may be stored in memory 107. For example, when using an asymmetric encryption algorithm, one key may be used for encryption and another key used for decryption.

If the determination at 404 and 406 was that the first and second sub-assembly are appropriately paired then the device 100 continues functioning in the normal manner (410), for example, by the processor 104 processing remaining instructions stored in the firmware memory 106. By normal manner is meant that the device 100 is able to operate as intended.

However, if the determination was that the first and second sub-assembly are not appropriately paired then an alternative action may be taken (408).

In one embodiment, an alternative action may be to prevent the device 100 from operating, for example, by the processor 104 not processing the remaining instructions stored in the firmware memory 106 until a determination is made that the main assembly 102 and sub-assembly 110 are appropriately paired.

In a further embodiment, an alternative action may be to prevent certain predetermined functionality of the device 100 from being used, thereby only enabling partial operation of the device 100. In a still further embodiment, an alternative action may be to display a message or error code, sound an alarm, or produce an output to indicate to a user that the pairing of the main assembly 102 and sub-assembly 110 is not authorized by the manufacturer of the device 100.

An alternative action may also cause a flag or other data to be stored in the memory 112 of the sub-assembly 110, in a memory of the main assembly 102, or in both the main assembly and sub-assembly, indicating the main assembly and sub-assembly were operated without an authorized pairing. This data would be accessible to an authorized service engineer to be able to determine whether any un-authorized repairs or service has been performed on the device 100. Such data may be useful, for example, to enable a manufacturer to determine whether a repair or service is covered by the terms of the manufacturer warranty or service contract.

In an alternative embodiment only a single set of programming instructions is stored in the firmware memory 106, the programming instructions containing the above-described pairing routine, the above-described verification routine, and programming instructions enabling normal operation of the device 100 by an end-user. In this embodiment, the pairing routine may be executed by the processor 104 detecting a predetermined sequence of inputs or events. For example, the programming instructions may include instructions to execute the pairing routine when the device 100 is powered up when a predetermined combination of device buttons or inputs (not shown) are held down. One disadvantage, however, of this alternative embodiment is that it may become known by unauthorized service agents how to execute the above-described pairing routing, enabling them to 'authorize' unpaired main and sub-assemblies.

It will be appreciated that not all of the above-described steps may be required in all embodiments of the present invention.

It will be appreciated that embodiments of the present invention can be realized in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. An apparatus comprising a main assembly having a processing element to:
   obtain first and second sub-assembly identifiers stored on a sub-assembly;
   determine whether the first and second sub-assembly identifiers are cryptographically related to each other based upon a cryptographic key stored in a memory on the main assembly;
   in response to a determination that the first and second sub-assembly identifiers are cryptographically related to each other, determine that the sub-assembly is pre-paired to the main assembly; and
   in response to a determination that the sub-assembly is pre-paired to the main assembly, enable operation of the main assembly and the sub-assembly.

2. The apparatus of claim 1, wherein the processing element is to disable operation of the main assembly and the sub-assembly upon a determination that the first and second sub-assembly identifiers are not cryptographically related to each other.

3. The apparatus of claim 1, wherein upon a determination that the first and second sub-assembly identifiers are cryptographically related to each other, the processing element is to store a predetermined flag in the memory on the main assembly.

4. The apparatus of claim 1, wherein upon a determination that the first and second sub-assembly identifiers are not cryptographically related to each other, the processor is to enable partial operation of the main assembly and the sub-assembly.

5. The apparatus of claim 1 wherein the memory is arranged such that the cryptographic key is not physically or logically accessible from outside the processing element.

6. The apparatus of claim 1, wherein to determine whether the first and second sub-assembly identifier are cryptographically related to each other, the processing element is to encrypt the first sub-assembly identifier with the stored cryptographic key and compare the encrypted first sub-assembly identifier with the second sub-assembly identifier.

7. The apparatus of claim 1, wherein to determine whether the first and second sub-assembly identifier are cryptographically related to each other, the processing element is to decrypt the second sub-assembly identifier using the stored cryptographic key and compare the decrypted second sub-assembly identifier with the first sub-assembly identifier.

8. The apparatus of claim 1, wherein the processing element is to make the determination at an occurrence of at least one of:
   power-up of the apparatus; and
   a predetermined frequency during operation of the apparatus.

9. A non-transitory computer readable medium having embodied thereon computer readable code which, when executed, performs a method of controlling the operation of an electronic device having a main assembly, the code to:
   obtain, from a memory on a sub-assembly coupled to the main assembly, a first sub-assembly identifier and a second sub-assembly identifier;
   determine whether one of the first and second sub-assembly identifiers is an encrypted version of the other sub-assembly identifier so as to determine whether the first and second sub-assembly identifiers are cryptographically related to each other,
   wherein the code to determine whether one of the first and second sub-assembly identifiers is an encrypted version of the other sub-assembly identifier includes code to use a cryptographic key stored in a memory on the main assembly, and
   in response to a determination that the first and second sub-assembly identifiers are cryptographically related to each other, determine that the sub-assembly is pre-paired to the main assembly and enable operation of the main assembly and the sub-assembly.

10. An electronic device comprising:

a main assembly to pair with a sub-assembly including a memory, the memory on the sub-assembly including a stored first sub-assembly identifier, the main assembly having a processing element, and a memory including a cryptographic key and instruction memory, the instruction memory of the main assembly including:

a pairing module to:

obtain the first sub-assembly identifier from the memory on the sub-assembly;

generate a second sub-assembly identifier by performing a cryptographic operation on the obtained first sub-assembly identifier using the cryptographic key stored on the main assembly, wherein the second sub-assembly identifier is an encrypted version of the first sub-assembly identifier; and store the generated second sub-assembly identifier in the sub-assembly memory to pair the main assembly to the sub-assembly; and a verification module to:

obtain the first and second sub-assembly identifiers stored in the memory on the sub-assembly;

determine whether the first and second sub-assembly identifiers are cryptographically related to each other, the determination being made using the cryptographic key stored in the memory on the main assembly, or another cryptographic key stored in the memory on the main assembly;

in response to a determination that the first and second sub-assembly identifiers are cryptographically related to each other, determine that the sub-assembly is pre-paired to the main assembly; and in response to a determination that the sub-assembly is pre-paired to the main assembly, enable operation of the main assembly and the sub-assembly.

11. The electronic device of claim 10, wherein the verification module is to prevent normal operation of the main and the sub-assembly upon determination that the first and second sub-assembly identifiers are not cryptographically related to each other.

12. The electronic device of claim 10, wherein the sub-assembly does not include a cryptographic key.

* * * * *